(12) United States Patent
Ikeuchi

(10) Patent No.: US 10,249,891 B2
(45) Date of Patent: Apr. 2, 2019

(54) ELECTROLYTE-CIRCULATING BATTERY

(71) Applicant: Sumitomo Electric Industries, Ltd., Osaka-shi (JP)

(72) Inventor: Atsuo Ikeuchi, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 15/119,445

(22) PCT Filed: Oct. 24, 2014

(86) PCT No.: PCT/JP2014/078285
§ 371 (c)(1),
(2) Date: Aug. 17, 2016

(87) PCT Pub. No.: WO2015/136763
PCT Pub. Date: Sep. 17, 2015

(65) Prior Publication Data
US 2017/0012308 A1  Jan. 12, 2017

(30) Foreign Application Priority Data

Mar. 11, 2014  (JP) ................................. 2014-048171

(51) Int. Cl.
*H01M 8/04276* (2016.01)
*H01M 8/18* (2006.01)
(Continued)

(52) U.S. Cl.
CPC ... *H01M 8/04276* (2013.01); *H01M 8/04014* (2013.01); *H01M 8/04029* (2013.01);
(Continued)

(58) Field of Classification Search
CPC ....... F28F 1/22; F28F 21/062; H01M 8/04029
See application file for complete search history.

(56) References Cited

U.S. PATENT DOCUMENTS 3,902,916 A * 9/1975 Warszawski .......... H01M 12/08
429/206
5,093,213 A * 3/1992 O'Callaghan ........... H01M 2/40
429/120
(Continued)

FOREIGN PATENT DOCUMENTS

JP    S60-037674 A    2/1985
JP    2004-225820 A   8/2004
(Continued)

OTHER PUBLICATIONS

Extended European Search Report in counterpart European Patent Application No. 14885479.7 dated Feb. 28, 2017.
(Continued)

*Primary Examiner* — Imran Akram
(74) *Attorney, Agent, or Firm* — Baker Botts L.L.P.; Michael A. Sartori

(57) ABSTRACT

Provided are an electrolyte-circulating battery in which electrolytes are unlikely to be oxidized and are easily cooled, a heat exchanger in which a corrosive liquid flowing through the inside thereof is unlikely to be oxidized and is easily cooled, and a pipe in which a corrosive liquid flowing through the inside thereof is unlikely to be oxelectrolyte-circulating batteryidized, and which is suitable for cooling the corrosive liquid. The electrolyte-circulating battery includes a battery cell and a circulation passage configured to circulate an electrolyte into the battery cell. The circulation passage includes a complex duct, and the complex duct includes a tubular main body composed of a resin and an oxygen block layer disposed on a periphery of the main body and composed of an organic material that has a lower oxygen transmission rate than the main body.

4 Claims, 4 Drawing Sheets

(51) Int. Cl.
*H01M 8/04014* (2016.01)
*H01M 8/20* (2006.01)
*H01M 8/04029* (2016.01)
*H01M 10/6568* (2014.01)

(52) U.S. Cl.
CPC ............ *H01M 8/18* (2013.01); *H01M 8/188* (2013.01); *H01M 8/20* (2013.01); *H01M 10/6568* (2015.04); *Y02E 60/528* (2013.01)

(56) References Cited

U.S. PATENT DOCUMENTS

| | | | | |
|---|---|---|---|---|
| 2005/0221040 A1* | 10/2005 | Koike | ........................ | B32B 1/08 428/36.91 |
| 2006/0099365 A1* | 5/2006 | Sasai | ........................ | B29C 65/02 428/35.7 |
| 2007/0207379 A1* | 9/2007 | Hatta | .................. | H01M 2/0207 429/176 |
| 2008/0254348 A1* | 10/2008 | Hatta | .................... | H01M 2/021 429/94 |
| 2009/0098416 A1* | 4/2009 | Hatta | .................... | H01M 2/021 429/7 |
| 2011/0259040 A1 | 10/2011 | Cataldo et al. | | |
| 2013/0040087 A1* | 2/2013 | Kazeto | ..................... | C08K 5/09 428/36.5 |
| 2013/0244090 A1* | 9/2013 | Tanaka | .................. | H01M 10/04 429/176 |
| 2013/0264743 A1* | 10/2013 | Urushidani | ....... | B29C 45/14688 264/279 |
| 2013/0309540 A1* | 11/2013 | Nakaishi | .................. | H01M 2/08 429/99 |
| 2014/0079985 A1* | 3/2014 | Borden | .................... | H01M 2/14 429/185 |
| 2015/0017542 A1* | 1/2015 | Hirai | ..................... | H01M 10/04 429/231.95 |
| 2015/0044580 A1* | 2/2015 | Yabe | ...................... | H01M 12/06 429/404 |
| 2015/0125763 A1* | 5/2015 | Zheng | ..................... | H01M 2/40 429/405 |
| 2015/0188183 A1* | 7/2015 | Nagai | ................. | H01M 2/1653 429/94 |
| 2016/0060402 A1* | 3/2016 | Yonekawa | ............... | C08L 29/04 525/231 |
| 2016/0221706 A1* | 8/2016 | Furusawa | ............... | B32B 27/32 |

FOREIGN PATENT DOCUMENTS

| | | |
|---|---|---|
| JP | 2004-225821 A | 8/2004 |
| JP | 2005-315405 A | 11/2005 |
| JP | 2013-037776 A | 2/2013 |
| JP | 2013-206566 A | 10/2013 |
| KR | 10-1088039 B1 | 11/2011 |
| WO | WO 2014/001899 A1 * | 1/2014 |

OTHER PUBLICATIONS

International Search Report in International Application No. PCT/JP2014/078285, dated Jan. 13, 2015.

* cited by examiner

ELECTROLYTE-CIRCULATING BATTERY

TECHNICAL FIELD

The present invention relates to an electrolyte-circulating battery such as a redox flow battery, a heat exchanger configured to cool a corrosive liquid such as an electrolyte of an electrolyte-circulating battery, and a pipe used as a flow path for a corrosive liquid. In particular, the invention relates to an electrolyte-circulating battery in which electrolytes are unlikely to be oxidized and are easily cooled.

BACKGROUND ART

An electrolyte-circulating battery such as a redox flow battery (RF battery) is a large-capacity storage battery that stores power derived from natural energy obtained by solar power generation, wind power generation, or the like. An RF battery performs charging and discharging using the difference in oxidation reduction potential between ions contained in a positive electrode electrolyte and ions contained in a negative electrode electrolyte. An example of the RF battery is shown in Patent Literature 1.

As shown in FIG. 4 which is an operating principle diagram for an RF battery, an RF battery 1 according to Patent Literature 1 includes a battery cell 100 which is separated into a positive electrode cell 102 and a negative electrode cell 103 by a separation membrane 101 that permeates hydrogen ions. The positive electrode cell 102 contains a positive electrode 104 and is connected to a positive electrode electrolyte tank 106 that stores a positive electrode electrolyte via a circulation passage including a supply flow path 108 and a discharge flow path 110. Similarly, the negative electrode cell 103 contains a negative electrode 105 and is connected to a negative electrode electrolyte tank 107 that stores a negative electrode electrolyte via a circulation passage including a supply flow path 109 and a discharge flow path 111.

The electrolytes in the tanks 106 and 107 are supplied from the supply flow paths 108 and 109 to the cells 102 and 103 by pumps 112 and 113 provided in the middle of the supply flow paths 108 and 109, discharged from the cells 102 and 103 through the discharge flow paths 110 and 111 to the tanks 106 and 107, and thus circulated within the cells 102 and 103, respectively. As the electrolytes, typically, aqueous solutions containing metal ions, such as vanadium ions, whose valence is changed by redox reaction are used. Since the flow paths 108 to 111 are directly in contact with the electrolytes, they are composed of ducts made of a material that does not react with the electrolytes and has excellent resistance to the electrolytes, for example, a resin such as polyvinyl chloride (PVC). In FIG. 4, solid line arrows indicate charging, and dashed line arrows indicate discharging.

In the RF battery 1, the electrolytes generate heat as a result of battery reactions. Because of the heat generation, battery efficiency may decrease, and the resin constituting the flow paths 108 to 111 in contact with the electrolytes may degrade, for example, may soften. In order to cope with this problem, in the RF battery 1, cooling devices 114 and 115 are provided in the middle of the discharge flow paths 110 and 111, respectively. The cooling devices 114 and 115 each include a heat exchanger (not shown) having a cooling region which generally constitutes part of the circulation passage, and a forced cooling mechanism (not shown) which forcibly cools the electrolyte inside the heat exchanger.

A flow path of the heat exchanger is composed of a duct made of a resin such as PVC as in the flow paths 108 to 111, and is arranged so as to meander from the inlet to the outlet thereof. Heat is absorbed from the electrolyte while the electrolyte moves from the inlet to the outlet of the heat exchanger (duct), and thus cooling is performed. In the cooling, a water cooling method in which the duct is cooled by cooling water or an air cooling method in which air is forcibly sent to the duct is used. In addition to the meandering configuration, for example, the flow path of the heat exchanger may be provided so as to branch into a plurality of linear portions while extending from the inlet to the outlet.

CITATION LIST

Patent Literature

PTL 1: Japanese Unexamined Patent Application Publication No. 2013-206566

SUMMARY OF INVENTION

Technical Problem

PVC, which is the constituent resin of the duct constituting each of the flow paths 108 to 111 or the flow path of the heat exchanger, has a poor heat-dissipating property and is unlikely to cool the electrolyte. If the thickness of the duct is decreased, although the heat-dissipating property is enhanced, oxygen permeation is likely to occur. When oxygen enters the duct, the electrolyte is oxidized by the oxygen, and the effective amount of the electrolyte may be decreased in some cases, resulting in a decrease in the discharge capacity of the battery or a decrease in battery efficiency.

The present invention has been accomplished under these circumstances, and an object of the invention is to provide an electrolyte-circulating battery in which electrolytes are unlikely to be oxidized and are easily cooled.

Another object of the present invention is to provide a heat exchanger in which a corrosive liquid flowing through the inside thereof is unlikely to be oxidized and is easily cooled.

Another object of the present invention is to provide a pipe in which a corrosive liquid flowing through the inside thereof is unlikely to be oxidized, and which is suitable for cooling the corrosive liquid.

Solution to Problem

An electrolyte-circulating battery according to an embodiment includes a battery cell and a circulation passage configured to circulate an electrolyte into the battery cell. The circulation passage includes a complex duct, and the complex duct includes a tubular main body composed of a resin and an oxygen block layer disposed on a periphery of the main body and composed of an organic material that has a lower oxygen transmission rate than the main body.

A heat exchanger according to an embodiment of the present invention includes a flow path through which a corrosive liquid flows, and a cooling region configured to cool the corrosive liquid and provided on at least part of the flow path. The cooling region includes a complex duct, and the complex duct includes a tubular main body composed of a resin and an oxygen block layer disposed on a periphery of the main body and composed of an organic material that has a lower oxygen transmission rate than the main body.

A pipe according to an embodiment of the present invention, in which a corrosive liquid flows through the inside thereof, includes a tubular main body composed of a resin and an oxygen block layer disposed on a periphery of the main body and composed of an organic material that has a lower oxygen transmission rate than the main body.

Advantageous Effects of Invention

In the electrolyte-circulating battery, the electrolyte is unlikely to be oxidized and is easily cooled.

In the heat exchanger, the corrosive liquid flowing through the inside thereof is unlikely to be oxidized and is easily cooled.

In the pipe, the corrosive liquid flowing through the inside thereof is unlikely to be oxidized, and the pipe is suitable for cooling the corrosive liquid.

DESCRIPTION OF EMBODIMENTS

Figure 1:
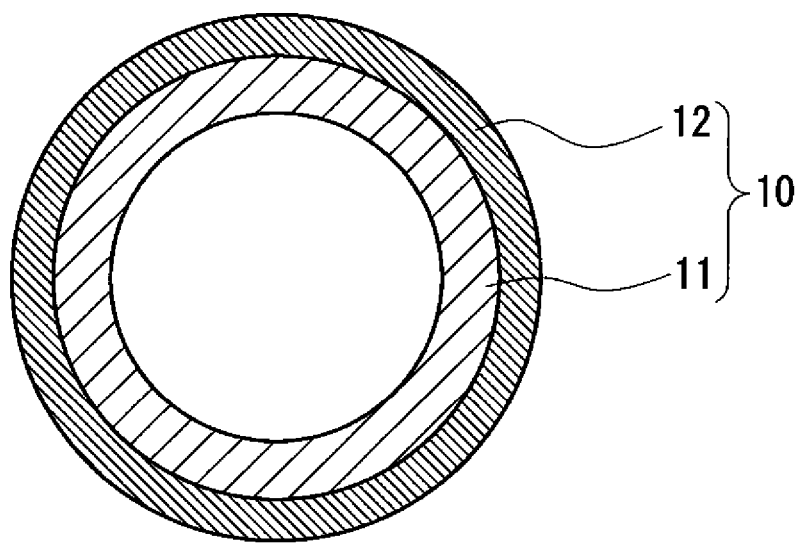
FIG. 1 is a cross-sectional view showing a complex duct provided in a redox flow battery according to Embodiment 1.

Description of Embodiments of the Present Invention

First, contents of embodiments of the present invention are enumerated and described.

(1) An electrolyte-circulating battery according to an embodiment of the present invention includes a battery cell and a circulation passage configured to circulate an electrolyte into the battery cell. The circulation passage includes a complex duct, and the complex duct includes a tubular main body composed of a resin and an oxygen block layer disposed on a periphery of the main body and composed of an organic material that has a lower oxygen transmission rate than the main body.

According to the configuration described above, the electrolyte is unlikely to be oxidized. The reason for this is that by providing the oxygen block layer so that oxygen entry is unlikely to occur, it is possible to suppress contact between the electrolyte and oxygen.

Furthermore, the electrolyte is easily cooled. The reason for this is that, as the thickness of the main body is decreased, although the heat-dissipating property is enhanced, oxygen entry is likely to occur; however, by providing the oxygen block layer so that oxygen is unlikely to enter the main body, the thickness of the main body can be decreased.

(2) The electrolyte-circulating battery described above may further include a heat exchanger provided in the middle of the circulation passage. In this case, the heat exchanger has a cooling region which constitutes part of the circulation passage and cools the electrolyte inside the circulation passage. The cooling region is composed of the complex duct.

According to the configuration described above, in the heat exchanger, since the cooling region which cools the electrolyte is composed of the complex duct, the electrolyte can be cooled satisfactorily without being oxidized.

(3) In the electrolyte-circulating battery described above, the main body may be composed of a polyethylene resin, and the oxygen block layer may be composed of an ethylene-vinyl alcohol copolymer.

According to the configuration described above, since the main body is composed of the polyethylene resin which has a high thermal conductivity, the electrolyte can be cooled satisfactorily. Furthermore, since the polyethylene resin has excellent workability, it can be easily formed into a desired shape. Since the polyethylene resin has a high oxygen transmission rate, oxygen entry is likely to occur; however, since the oxygen block layer is composed of the ethylene-vinyl alcohol copolymer which has a low oxygen transmission rate, entry of oxygen into the main body can be suppressed.

(4) In the electrolyte-circulating battery described above, the thickness of the main body may be 1 mm or less.

According to the configuration described above, since the oxygen block layer is provided, the thickness of the main body can be set to 1 mm or less. By setting the thickness of the main body to 1 mm or less, the heat-dissipating property can be enhanced, and the electrolyte can be cooled satisfactorily.

(5) In the electrolyte-circulating battery described above, the circulation passage may include a plurality of the complex ducts and junctions which join the complex ducts to one another. In this case, the junctions are formed by fusion bonding the complex ducts to one another.

According to the configuration described above, since the complex ducts are joined by fusion bonding, the bond strength between the complex ducts can be increased compared with the case where joining is performed using an adhesive. Furthermore, in addition to not needing an adhesive, it is possible to eliminate a complicated operation due to use of an adhesive. Moreover, fusion bonding can enhance the sealing performance at the junctions, and it is unlikely that the electrolyte will leak out of the junctions.

(6) The electrolyte-circulating battery described above may include a fan that air-cools the heat exchanger.

According to the configuration described above, the electrolyte can be cooled satisfactorily. Furthermore, the configuration can be simplified compared with the case where the heat exchanger is water-cooled. The reason for this is that members, such as a pump that supplies (circulates) cooling water to the heat exchanger, and a cooler that cools cooling water, are not required.

(7) A heat exchanger according to an embodiment of the present invention includes a flow path through which a corrosive liquid flows, and a cooling region configured to cool the corrosive liquid and provided on at least part of the flow path. The cooling region includes a complex duct, and the complex duct includes a tubular main body composed of a resin and an oxygen block layer disposed on a periphery of the main body and composed of an organic material that has a lower oxygen transmission rate than the main body.

According to the configuration described above, since the cooling region of the heat exchanger includes the complex duct, the corrosive liquid flowing through the inside thereof is unlikely to be oxidized and is easily cooled. Herein, the corrosive liquid refers to a liquid that generates heat as a result of chemical reactions, battery reactions, Joule heat due to current flow, or the like and requires heat dissipation during flowing.

(8) A pipe according to an embodiment of the present invention, in which a corrosive liquid flows through the inside thereof, includes a tubular main body composed of a resin and an oxygen block layer disposed on a periphery of the main body and composed of an organic material that has a lower oxygen transmission rate than the main body.

According to the configuration described above, since the pipe includes the oxygen block layer, the corrosive liquid flowing through the inside thereof is unlikely to be oxidized. Furthermore, since the pipe includes the oxygen block layer, the thickness of the main body can be decreased, and therefore, the pipe is suitable for cooling the corrosive liquid.

Detailed Description of Embodiments of the Present Invention

Embodiments of the present invention will be described in detail below with reference to the drawings. It is intended that the present invention is not limited to the examples shown in the embodiments, but is determined by appended claims, and includes all variations of the equivalent meanings and ranges to the claims. Herein, a description will be made on a redox flow battery (RF battery) as an example of an electrolyte-circulating battery.

Embodiment 1

An RF battery according to an embodiment includes, as in the existing RF battery described with reference to FIG. 4, a battery cell 100, a circulation passage (a supply flow path 108 and a discharge flow path 110) configured to circulate a positive electrode electrolyte stored in a tank 106 to a positive electrode cell 102, and a circulation passage (a supply flow path 109 and a discharge flow path 111) configured to circulate a negative electrode electrolyte stored in a tank 107 to a negative electrode cell 103. The electrode electrolytes are circulated by pumps 112 and 113 provided in the middle of the corresponding circulating passages. The RF battery according to the embodiment is mainly characterized in that the circulation passages each include a complex duct having a specific structure and composed of a specific material. That is, since the structure of the circulation passage of the RF battery according to Embodiment 1 differs from that of the existing RF battery, in the embodiment below, a description will be made, focusing on the structure of the circulation passage. This embodiment is provided with a cooling device, and the cooling device includes a heat exchanger provided in the middle of the circulation passage. The heat exchanger has a cooling region which constitutes part of the circulation passage. The cooling region of the heat exchanger is composed of the complex duct described above. A description will be made on the structure of the complex duct first, and then the structure of the heat exchanger (cooling device) provided with the complex duct, followed by a description on the other components. The same components as those of the existing battery are designated by the same reference signs as those in FIG. 4, and a description thereof will be omitted.

[Complex Duct]

In a complex duct 10 shown in FIG. 1, an electrolyte, which will be described later, flows through the inside thereof. The complex duct 10 has a multi-layered structure including a tubular main body 11 composed of a resin and an oxygen block layer 12 disposed on a periphery of the main body 11 and composed of an organic material that has a lower oxygen transmission rate than the main body 11.

(Main Body)

The main body 11 forms a flow path in which an electrolyte flows through the inside thereof. As the constituent resin of the main body 11, a resin that does not react with the electrolyte and has excellent resistance to the electrolyte may be used. Specific examples of the resin include polyvinyl chloride (PVC), polypropylene (PP), polyethylene (PE), and polytetrafluoroethylene (PTFE), and among them, PE is suitably used. Compared with a PVC resin which has been generally used, a PE resin has a high oxygen transmission rate, and oxygen is likely to enter the inside thereof. However, by providing the oxygen block layer 12, which will be described later, the PE resin can be used as the constituent material of the main body 11. Since the PE resin has a higher thermal conductivity than the other resins described above, the electrolyte is easily cooled. Furthermore, since the PE resin has excellent workability, such as bending workability, for example, in the case where the main body 11 is made to meander in order to increase the length (hereinafter may be referred to as the forced cooling length) of the heat exchanger constituting part of the circulation passage, the overall size can be decreased compared with the PVC resin. Furthermore, since the PE resin can be subjected to fusion bonding, for example, complex ducts 10 can be joined to one another by fusion boding. Therefore, use of an adhesive is made unnecessary, and it is possible to eliminate a complicated operation due to use of an adhesive. In this example, the main body 11 is composed of a PE resin.

The shape of the main body 11 is tubular as described above, and the cross-sectional shape thereof may be circular, elliptical, polygonal such as rectangular, or the like. When the cross-sectional shape is circular or elliptical, the pressure loss during flow of the electrolyte can be decreased. In particular, when the cross-sectional shape is circular, the electrolyte is easily cooled evenly. In this example, the cross-sectional shape of the main body 11 is circular.

The thickness of the main body 11 is preferably as small as possible from the viewpoint that the electrolyte cooling performance can be enhanced with a decrease in the thickness. Regarding a duct composed of a PVC resin, such as the existing one, it is difficult to decrease the thickness of the duct because the likelihood of entry of oxygen increases with a decrease in the thickness, and a thickness of 2 mm or more is required when the duct constitutes a heat exchanger of an RF battery. In contrast, in the complex duct 10 according to this embodiment, since the oxygen block layer 12, which will be described later, is provided, it is possible to suppress entry of oxygen into the main body 11, and therefore, the thickness of the main body 11 can be decreased. Specifically, the thickness of the main body 11 can be set at 1 mm or less, and further 0.7 mm or less. The thickness of the main body is preferably set at 0.5 mm or more, by which the main body 11 has excellent mechanical strength. In particular, the thickness of the main body 11 may be appropriately selected, with the thickness of the oxygen block layer 12 in mind, such that the thickness of the complex duct 10 is 1 mm or less and further 0.7 mm or less.

(Oxygen Block Layer)

The oxygen block layer 12 suppresses entry of oxygen from the outside into the main body 11. The oxygen block layer 12 covers the entire periphery of the main body 11. The oxygen block layer 12 has a shape corresponding to the outer contour of the main body 11. For example, when the main body 11 is a cylinder, the shape of the oxygen block layer 12 is also cylindrical.

The material for the oxygen block layer 12 is, as described above, an organic material that has a lower oxygen transmission rate than the main body 11. When the oxygen block layer 12 is composed of an organic material having a low oxygen transmission rate, entry of oxygen into the main body 11 can be suppressed, and the thickness of the main body 11 can be decreased, thus enhancing the electrolyte cooling performance. Specific examples of the material include an ethylene-vinyl alcohol copolymer (saponified ethylene-vinyl acetate random copolymer), a polyvinylidene chloride resin, a polyvinyl alcohol resin, nylon 6, and the like.

The thickness of the oxygen block layer 12 is preferably 20 to 500 μm. When the thickness of the oxygen block layer 12 is 20 μm or more, oxygen entry can be satisfactorily suppressed. When the thickness of the oxygen block layer 12 is 500 μm or less, the thickness is not excessively large, and the electrolyte can be efficiently cooled.

The complex duct 10 can be produced, for example, by the methods (1) to (3) described below. (1) A film or sheet of an oxygen block layer 12 is attached with an adhesive to the periphery of a main body 11 which has been extruded. (2) A main body 11 which has been extruded is coated by extrusion with an oxygen block layer 12. (3) A main body 11 and an oxygen block layer 12 are coextruded, by which the oxygen block layer 12 is formed on the periphery of the main body 11 simultaneously with the formation of the main body 11. In the method (2) or (3), the bond strength between the main body 11 and the oxygen block layer 12 can be increased. In addition, because of being free from a joint which is formed when a film or sheet is attached, the oxygen block layer 12 can be formed closely over the entire periphery of the main body 11, and oxidation of the electrolyte can be further suppressed. In particular, in the method (3), since the main body 11 and the oxygen block layer 12 can be formed simultaneously, it is possible to increase the productivity of the complex duct 10.

[Cooling Device]

Figure 2:
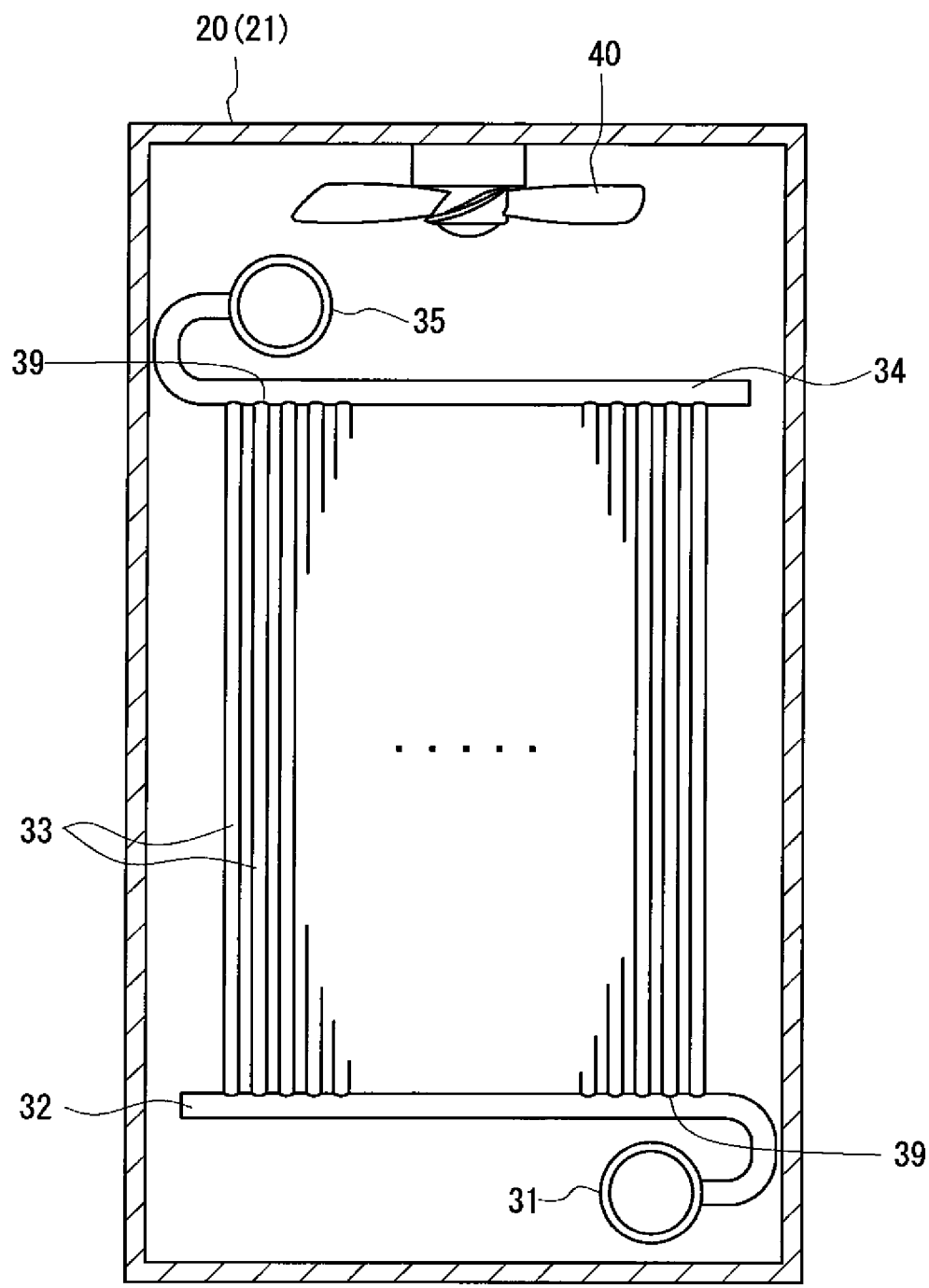
FIG. 2 is a schematic view showing a heat exchanger provided in the redox flow battery according to Embodiment 1.
Figure 4:
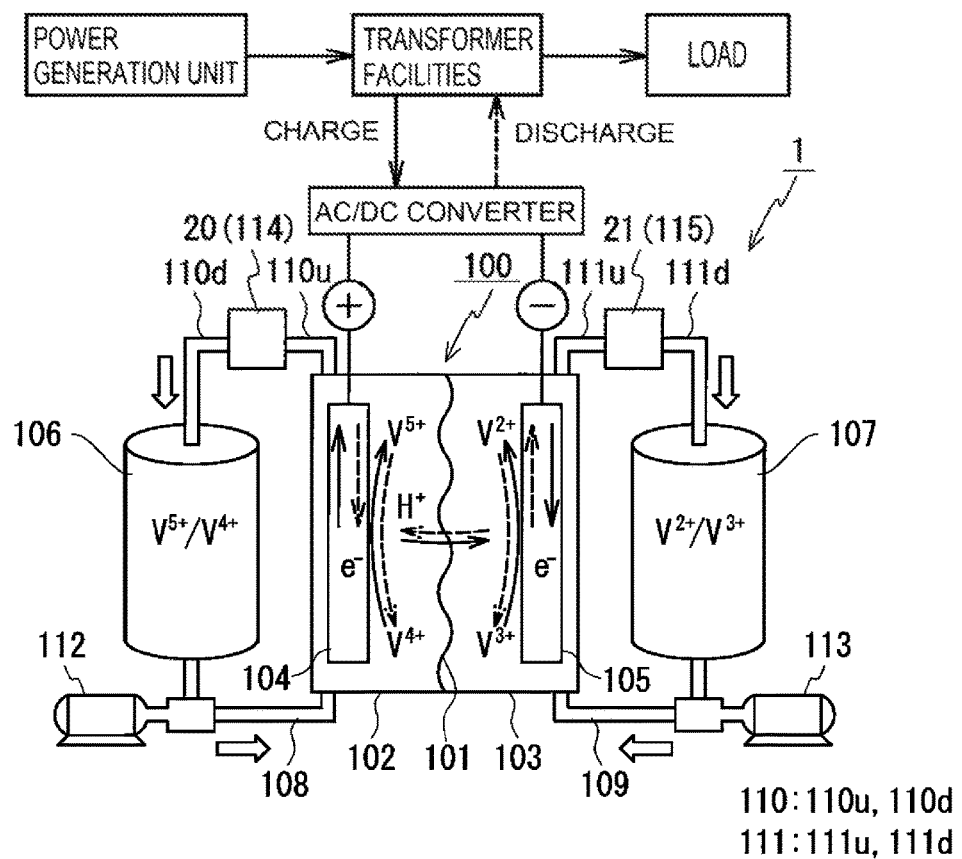
FIG. 4 is an operating principle diagram of a redox flow battery.

Cooling devices 20 and 21 shown in FIGS. 2 and 4 cool the electrolytes by absorbing heat of the electrolytes. The cooling devices 20 and 21 each include a heat exchanger 30 provided in the middle of the corresponding circulation passage and having a cooling region constituting part of the circulation passage and a forced cooling mechanism which forcibly cools the heat exchanger 30. In this embodiment, as described above, the heat exchanger 30 includes the complex duct 10 described above.

(Heat Exchanger)

In the heat exchanger 30, the electrolyte in the circulation passage is cooled. Although the cooling may be spontaneous cooling, by performing forced cooling using the forced cooling mechanism which will be described below, the electrolyte can be cooled satisfactorily. The heat exchangers 30 may be provided in the middle of the supply flow paths 108 and 109 or in the middle of the discharge flow paths 110 and 111, but are preferably provided in the middle of the discharge flow paths 110 and 111. The electrode electrolytes generate heat as a result of battery reactions. Accordingly, by providing the heat exchangers 30 in the middle of the discharge flow paths 110 and 111, the electrolytes can be cooled satisfactorily. In this example, the heat exchangers 30 are provided in the middle of the discharge flow paths 110 and 111.

The inlets (in FIG. 2, inflow path 31) of the heat exchangers 30 are connected to upstream side discharge flow paths 110$u$ and 111$u$ in the discharge flow paths 110 and 111 (FIG. 4), and the outlets (in FIG. 2, outflow path 35) of the heat exchangers 30 are connected to downstream side discharge flow paths 110$d$ and 111$d$. The electrolytes discharged from the electrode cells 102 and 103 are made to flow from the upstream side discharge flow paths 110$u$ and 111$u$ through the inlets of the heat exchangers 30 into the heat exchangers 30, and heat is absorbed from the electrolytes while the electrolytes move from the inlets to the outlets of the heat exchangers 30. The electrolytes whose heat has been absorbed are discharged from the outlets of the heat exchangers 30 through the downstream side discharge flow paths 110$d$ and 111$d$ to the electrode tanks 106 and 107, respectively.

The flow path extending from the inlet to the outlet of each heat exchanger 30 may be a continuous flow path or may include a plurality of flow paths. In the case of a continuous flow path, the flow path is preferably meandered. Thereby, the size of the heat exchanger 30, and thus the size of each of the cooling devices 20 and 21, can be decreased compared with the case where the flow path is formed in a linear shape, on the condition of the same cross-sectional area of the flow path and the same flow path length. Furthermore, on the condition of the same size of the heat exchanger 30, compared with a linear flow path, the surface area of the complex duct 10 constituting the flow path can be increased (the forced cooling length can be increased), and the electrolyte is easily cooled to a desired temperature. In the case where a plurality of flow paths are used, each flow path may be linear or meandered. On the condition of the same cross-sectional area of the flow path and the same flow path length as those of a continuous flow path, by using a plurality of flow paths, the cross-sectional area (diameter) of each flow path can be decreased, and therefore, the total surface area of the complex ducts 10 constituting the flow paths can be increased. Furthermore, since the cross-sectional area (diameter) of each flow path can be decreased, the center section of the flow path is easily cooled.

In this example, the flow path extending from the inlet to the outlet of the heat exchanger 30 is configured to include a plurality of flow paths. Specifically, the heat exchanger 30 includes an inflow path 31 which makes the electrolyte to flow into the heat exchanger 30 (cooling device 20 or 21), an outflow path 35 which makes the electrolyte to flow out of the heat exchanger 30 (cooling device 20 or 21), and a plurality of branching paths 33 which are disposed between the inflow path 31 and the outflow path 35 and mainly cool the electrolyte in the heat exchanger 30. The inflow path 31 and the outflow path 35 are joined to the branching paths 33 through a relay path 32 and an aggregate path 34, respectively. Each of the flow paths 31 to 35 is composed of a complex duct 10.

The inflow path 31 makes the electrolyte discharged from the electrode cell 102 or 103 to flow into the heat exchanger 30 (cooling device 20 or 21). One end of the inflow path 31 is joined to the upstream side discharge flow path 110$u$ or 111$u$ (FIG. 4).

The relay path 32 connects the inflow path 31 to the branching paths 33 and divides the electrolyte flowing therein from the inflow path 31 into the branching paths 33. One end of the relay path 32 is joined to the middle section of the inflow path 31. The other end of the relay path 32 is closed. A plurality of branching paths 33 are joined to the middle section of the relay path 32.

The branching paths 33 are flow paths which mainly cool the electrolyte in the heat exchanger 30. One end of each branching path 33 is joined to the relay path 32, and the other end is joined to the aggregate path 34. Each branching path 33 may be in a linear shape extending from one end to the other end or may be meandered. In the case where each branching path 33 is in a linear shape, it is not necessary to bend the complex duct 10 constituting the branching path 33, and the pressure loss of the electrolyte is small compared with a meandering branching path 33. In the case where each branching path 33 is meandered, the size of the heat exchanger 30, and thus the size of each of the cooling devices 20 and 21, can be decreased compared with the case where each branching path 33 is formed in a linear shape, on the condition of the same cross-sectional area of the flow path and the same flow path length. Furthermore, since the main body 11 of the complex duct 10 is composed of a PE resin, the complex duct 10 is easily bent. Therefore, the size of the heat exchanger 30 (cooling device 20 or 21) can be decreased compared with the case where a meandering flow path is formed by bending a duct composed of a PVC resin as in the existing technique. On the other hand, on the condition of the same size of the heat exchanger 30, compared with a linear branching path 33, the surface area of the complex duct 10 can be increased (the forced cooling length can be increased), and the electrolyte is easily cooled to a desired temperature. In this example, the branching paths 33 are each in a linear shape and are arranged in parallel between the relay path 32 and the aggregate path 34. The cross-sectional area (diameter) of each branching path 33 is smaller than that of the other flow paths (the inflow path 31, the relay path 32, the aggregate path 34, and the outflow path 35) constituting the heat exchanger 30.

The aggregate path 34 combines flows of the electrolyte from the branching paths 33 and transports the electrolyte to the outflow path 35. One end of the aggregate path 34 is joined to the outflow path 35, and the other end is closed. The other end of each branching path 33 is joined to the middle section of the aggregate path 34.

The outflow path 35 makes the electrolyte transported from the aggregate path 34 to flow out of the heat exchanger 30 (cooling device 20 or 21). One end of the outflow path 35 is joined to the downstream side discharge flow path 110d or 111d (FIG. 4).

Joining between the inflow path 31 and the relay path 32, joining between the relay path 32 and the branching paths 33, joining between the branching paths 33 and the aggregate path 34, and joining between the aggregate path 34 and the outflow path 35 are performed through junctions 39. FIG. 2 shows junctions 39 between the relay path 32 and the branching paths 33 and between the aggregate path 34 and the branching paths 33, and other junctions are omitted. Each junction 39 is preferably formed by fusion bonding of the complex ducts 10 constituting the corresponding members. Since the main body 11 of each complex duct 10 is composed of a PE resin, the junctions 39 can be formed by fusion bonding. By fusion bonding the complex ducts 10 to one another, an adhesive is not needed in bonding the complex ducts 10 to one another, and it is possible to eliminate a complicated operation due to use of an adhesive. Moreover, fusion bonding can enhance the sealing performance at the junctions 39, and leakage of the electrolyte is likely to be prevented. At the surfaces of the junctions 39, the main bodies 11 are allowed to be exposed from the oxygen block layers 12. The reason for this is that although the main bodies 11 may be exposed at the surfaces of the junctions 39 by fusion bonding in some cases, the percentage of the exposed portions relative to the entire heat exchanger 30 is small, and the effect of oxidation of the electrolyte due to entry of oxygen from the exposed portions is small.

(Forced Cooling Mechanism)

Examples of the forced cooling mechanism include a water cooling method in which cooling is performed with cooling water and an air cooling method in which air is sent. In the case of a water cooling method, for example, the heat exchanger 30 is placed in a container, and cooling water is supplied (circulated) into the container. In this case, entry of oxygen from the outside can be suppressed by cooling water, which is preferable. However, oxygen may be dissolved in cooling water in some cases. Since the heat exchanger 30 includes the complex ducts 10 described above, it is possible to suppress entry of oxygen dissolved in cooling water. On the other hand, in the case of an air cooling method, for example, a fan 40 is provided. In this case, cooling water is, of course, not needed, and members, such as a pump for supplying (circulating) cooling water and a cooler for cooling water, are not needed. Therefore, the forced cooling mechanism can be downsized and simplified compared with the water cooling method. In this example, the forced cooling mechanism includes the fan 40.

The fan 40 may be placed at any position where wind can be applied to the entire heat exchanger 30, in particular, the branching paths 33. For example, the fan 40 may be provided at a position orthogonal to both the longitudinal direction and the parallel direction of the branching paths 33, or may be provided at a position along the circulation direction of the branching paths 33. In this example, the fan 40 is provided at a position along the circulation direction of the branching paths 33, i.e., directly above the aggregate path 34.

The heat exchanger 30 is configured to include the flow paths 31 to 35. However, a heat exchanger 30 may be configured to include an inflow path 31, a plurality of cooling units, and an outflow path 35, each cooling unit including a relay path 32, a plurality of branching paths 33, and an aggregate path 34. In this case, the cooling units are placed in parallel, one end of the relay path 32 of each cooling unit is connected to the middle section of the inflow path 31, and one end of the aggregate path 34 is connected to the middle section of the outflow path 35. That is, in FIG. 2, a plurality of cooling units are placed in parallel toward the back side of the sheet.

(Electrolyte)

As the electrode electrolytes, vanadium ion aqueous solutions are used in this example as shown in FIG. 4. However, the electrolytes are not limited to vanadium ion aqueous solutions. Examples of a combination of the electrode electrolytes include the followings: (1) the positive electrode electrolyte contains manganese ions, and the negative electrode electrolyte contains at least one type of metal ions selected from the group consisting of titanium ions, vanadium ions, chromium ions, zinc ions, and tin ions; (2) the positive electrode electrolyte contains both manganese ions and titanium ions, and the negative electrode electrolyte contains at least one type of metal ions selected from the group consisting of titanium ions, vanadium ions, chromium ions, zinc ions, and tin ions; (3) the positive electrode electrolyte and the negative electrode electrolyte each contain both manganese ions and titanium ions; and (4) the positive electrode electrolyte contains iron ions, and the negative electrode electrolyte contains at least one type of metal ions selected from the group consisting of titanium ions, vanadium ions, chromium ions, zinc ions, and tin ions.

As the solvent for the electrolytes, at least one aqueous solution selected from the group consisting of $H_2SO_4$, $K_2SO_4$, $Na_2SO_4$, $H_3PO_4$, $H_4P_2O_7$, $K_2HPO_4$, $Na_3PO_4$, $K_3PO_4$, $HNO_3$, $KNO_3$, HCl, and $NaNO_3$ can be used. In particular, those containing a sulfate anion ($SO_4^{2-}$) are easy to use.

[Description of Other Components]

Figure 3:
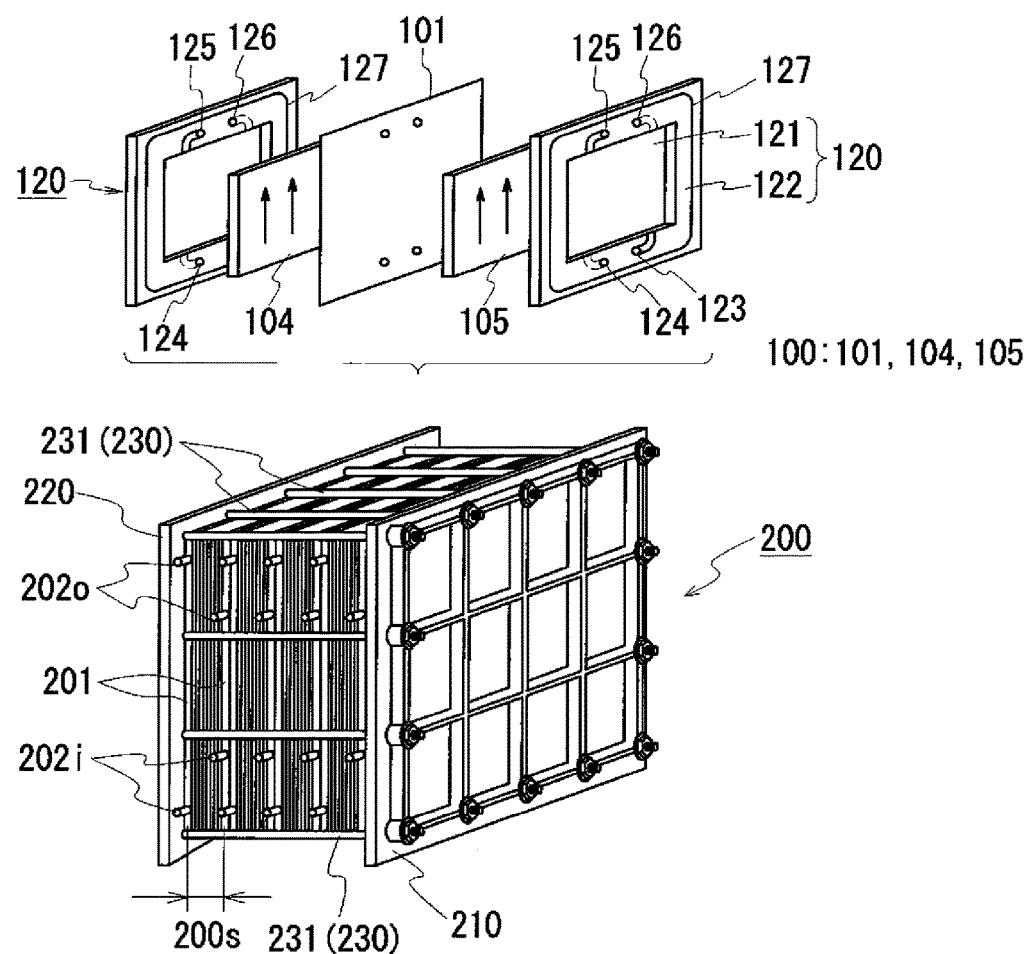
FIG. 3 is a schematic diagram of a cell stack provided in the redox flow battery according to Embodiment 1.

The RF battery 1 includes, as shown in FIG. 3, a cell stack 200 in which a plurality of sub-cell stacks 200s, each including a plurality of battery cells 100, are stacked. The cell stack 200 is configured such that a plurality of stacked sub-cell stacks 200s are sandwiched between two end plates 210 and 220 and fastened with a fastening mechanism 230. The fastening mechanism 230, for example, includes a fastening shaft 231, nuts (not shown) screwed onto both ends of the fastening shaft 231, and a compression spring (not shown) interposed between the nut and the end plate 210.

Each sub-cell stack 200s includes a stacked body formed by stacking a cell frame 120 including a bipolar plate 121 and a frame 122 that holds the periphery of the bipolar plate 121, a positive electrode 104, a separation membrane 101, and a negative electrode 105 in this order. In this configuration, a battery cell 100 is formed between the bipolar plates 121 of the adjacent cell frames 120. Furthermore, the sub-cell stack 200s includes a pair of current collector plates disposed on both sides of the stacked body and a pair of supply/discharge plates 201 disposed on the pair of current collector plates. The current collector plates are electrically connected to the bipolar plates 121 located at both ends in the stacking direction of the stacked body. A terminal portion protrudes outward from the periphery of the current collector plate between the pair of supply/discharge plates 201 (between the supply/discharge plate 201 and the end bipolar plate 121). Input and output of electricity between the battery cell 100 of the sub-cell stack 200s and an external device are performed through the terminal portion.

Each supply/discharge plate 201 is provided with a supply pipe 202i to be connected to the supply flow path 108 (109) and a discharge pipe 202o to be connected to the discharge flow path 110 (111). The electrolytes are circulated between the sub-cell stack 200s and the tanks 106 and 107 through the pipes 202i and 202o, respectively.

In the sub-cell stack 200s, circulation of the electrolytes is performed by using liquid supplying manifolds 123 and 124 and liquid discharging manifolds 125 and 126 which are provided on the frame 122. The positive electrode electrolyte is supplied from the liquid supplying manifold 123 through a channel formed on one surface side (front side of the sheet) of the frame 122 to the positive electrode 104, and is discharged through a channel formed on the upper part of the frame 122 to the liquid discharging manifold 125. Similarly, the negative electrode electrolyte is supplied from the liquid supplying manifold 124 through a channel formed on the other surface side (back side of the sheet) of the frame 122 to the negative electrode 105, and is discharged through a channel formed on the upper part of the frame 122 to the liquid discharging manifold 126. Ring-shaped sealing members 127, such as O-rings and flat packings, are disposed between the frames 122 so that leakage of the electrolytes from the sub-cell stack 200s can be prevented.

[Operational Advantages]

In the RF battery 1 described above, the following advantages are obtained.

(1) Since each of the flow paths 31 to 35 is composed of the complex duct 10 including the main body 11 and the oxygen block layer 12, the electrolyte flowing in the heat exchanger 30 can be cooled satisfactorily without being oxidized. Entry of oxygen into the main body 11 can be suppressed by the oxygen block layer 12 on the periphery of the main body 11. Since entry of oxygen can be suppressed by the oxygen block layer 12, the thickness of the main body 11 can be decreased, and therefore, heat dissipation of the electrolyte can be enhanced. Accordingly, it is possible to suppress a decrease in the effective amount of the electrolyte due to oxidation of the electrolyte, and as a result, it is possible to suppress a decrease in the discharge capacity of the battery or a decrease in battery efficiency.

(2) Since the main body 11 and the oxygen block layer 12 constituting the complex duct 10 are each composed of a resin, it is possible to reduce the weight of the heat exchanger 30, and further the weight of the cooling device 20 or 21. In particular, the thickness of the complex duct 10 can be decreased, which contributes to a reduction in the weight of the heat exchanger 30 (cooling device 20 or 21). Furthermore, even if the electrolyte leaks out of the junctions 39 between the complex ducts 10, the oxygen block layers 12 are not corroded, and since the complex ducts 10 do not include a conductive member, there is no concern that the complex ducts 10 will become electrical leakage paths.

Embodiment 2

According to Embodiment 2, in addition to the configuration of Embodiment 1 (the heat exchanger 30 of each of the cooling devices 20 and 21 is fabricated using complex ducts 10), each of the circulation passages (flow paths 108 to 111) can be composed of a complex duct 10. In this case, the junction that joins the upstream side discharge flow path 110u or 111u to the inflow path 31 and the junction that joins the downstream side discharge flow path 110d or 111d to the outflow path 35 can each be formed by fusion bonding. As described above, in the existing technique, each circulation passage and a heat changer are composed of a PVC resin. In the existing case, generally, each circulation passage and a heat exchanger are joined together using an adhesive or by mechanical joining (bolts and nuts). In contrast, according to this embodiment, each circulation passage and the heat exchanger 30 are composed of complex ducts 10, and thereby, both can be joined together by fusion bonding. Therefore, use of an adhesive, bolts, nuts, or the like is made unnecessary, and it is possible to eliminate a complicated joining operation due to use thereof.

According to this embodiment, since each circulation passage is composed of the complex duct 10, it is also possible to suppress oxidation of the electrolyte during flowing through the circulation passage. In addition, although natural cooling is performed instead of cooling by a forced cooling mechanism such as that in the heat exchanger 30 (cooling device 20 or 21), the electrolyte can be cooled in each circulation passage, thus enhancing the electrolyte cooling performance. Furthermore, in addition to joining between each circulation passage and the heat exchanger, joining between each circulation passage and the tank 106 or 107 and joining between each circulation passage and the cell stack can be performed by fusion bonding.

Embodiment 3

In Embodiments 1 and 2, the complex duct 10 is configured to have a two-layered structure including the main body 11 and the oxygen block layer 12. According to Embodiment 3, a complex duct may be configured to include a main body, an oxygen block layer, and a single- or multi-layered protective layer disposed on a periphery of the oxygen block layer. By providing the protective layer on the periphery of the oxygen block layer, the oxygen block layer can be mechanically protected. The protective layer can be composed of the same type of resin as that for the main body, and is preferably composed of the same resin as that for the main body. Thereby, the electrolyte can be satisfactorily cooled. In this example, a PE resin is used. The total thickness of the main body and the protective layer is preferably 1 mm or less and more preferably 0.7 mm or less. The total thickness is preferably 0.5 mm or more. Furthermore, the thickness of the entire complex duct is preferably 1 mm or less and more preferably 0.7 mm or less. This complex duct is suitably produced by coextrusion of three layers: the main body, the oxygen block layer, and the protective layer.

According to this embodiment, while protecting the oxygen block layer with the protective layer on the periphery of the oxygen block layer, the total thickness of the main body and the protective layer is not increased compared with the two-layered structure described above. Therefore, heat dissipation of the electrolyte is not decreased, and the electrolyte can be cooled satisfactorily.

Embodiment 4

In Embodiments 1 to 3, descriptions have been made on the configuration in which the heat exchanger and circulation passages through which the electrolyte of an RF battery flows include complex ducts. According to Embodiment 4, a flow path of a corrosive liquid other than the electrolyte of an RF battery may include a complex duct. The corrosive liquid is a liquid that generates heat as a result of chemical reactions, battery reactions, Joule heat due to current flow, or the like and requires heat dissipation during flowing. In particular, examples of the corrosive liquid include a liquid that corrodes metal, such as sulfuric acid, nitric acid, or hydrochloric acid. Among the flow paths of a heat exchanger through which such a corrosive liquid flows, a cooling region which is provided on at least part of a flow path to cool the corrosive liquid can be composed of the complex duct.

The RF battery 1 in each of Embodiments 1 to 3 is configured to include a cell stack in which a plurality of sub-cell stacks each including a plurality of battery cells are stacked. However, the RF battery 1 may be a single-cell battery or may include a cell stack in which a plurality of battery cells are stacked between a pair of supply/discharge plates.

INDUSTRIAL APPLICABILITY

Electrolyte circulation type batteries according to an embodiment of the present invention can be suitably used, with respect to new energy power generation, such as solar power generation or wind power generation, for the purpose of stabilizing variation of power output, storing generated power during oversupply, leveling load, and the like. Electrolyte circulation type batteries according to the embodiment of the present invention can also be provided in a general power plant and used as large-capacity storage batteries as countermeasures against voltage sag/power failure and for the purpose of leveling load. Furthermore, a heat exchanger according to an embodiment of the present invention can be suitably used in an electrolyte-circulating battery according to the embodiment of the present invention, for example, an RF battery, and also used as a heat exchanger for chemical liquids and the like. A pipe according to an embodiment of the present invention can be suitably used in a heat exchanger according to the embodiment of the present invention and a heat exchanger and circulation passages of an electrolyte-circulating battery according to the embodiment of the present invention, for example, an RF battery, and also used as a pipe for chemical liquids.

REFERENCE SIGNS LIST 1 redox flow (RF) battery
10 complex duct
11 main body 12 oxygen block layer
20, 21 cooling device
30 heat exchanger
31 inflow path 32 relay path 33 branching path 34 aggregate path
35 outflow path
39 junction
40 fan
100 battery cell
101 separation membrane 102 positive electrode cell
103 negative electrode cell
104 positive electrode 105 negative electrode
106 positive electrode electrolyte tank 107 negative electrode electrolyte tank
108, 109 supply flow path
110, 111 discharge flow path
110$u$, 111$u$ upstream side discharge flow path
110$d$, 111$d$ downstream side discharge flow path
112, 113 pump
114, 115 cooling device
120 cell frame 121 bipolar plate 122 frame
123, 124 liquid supplying manifold 125, 126 liquid discharging manifold
127 sealing member
200 cell stack 200$s$ sub-cell stack
201 supply/discharge plate 202$i$ supply pipe 202$o$ discharge pipe
210, 220 end plate
230 fastening mechanism
231 fastening shaft

The invention claimed is:
1. An electrolyte-circulating battery comprising:
a battery cell; and
a circulation passage joined to the battery cell and configured to circulate an electrolyte into the battery cell; wherein the circulation passage includes a complex duct, and
the complex duct includes a tubular main body composed of a polyethylene resin, an oxygen block layer disposed on a periphery of the main body and composed of an ethylene-vinyl alcohol copolymer that has a lower oxygen transmission rate than the main body, and a protective layer disposed on the periphery of the oxygen block layer and mechanically protecting the oxygen block layer, and the thickness of the entire complex duct is 1 mm or less.
2. The electrolyte-circulating battery according to claim 1, further comprising a heat exchanger provided in the middle of the circulation passage,
wherein the heat exchanger has a cooling region which constitutes part of the circulation passage and cools the electrolyte inside the circulation passage,
complex duct constitutes the cooling region of the heat exchanger, the cooling region comprises a branching of the complex duct.

3. The electrolyte-circulating battery according to claim 2, comprising a fan that air-cools the heat exchanger.

4. The electrolyte-circulating battery according to claim 1, wherein the circulation passage includes a plurality of the complex ducts and junctions which join the complex ducts to one another, and the junctions are formed by fusion bonding the complex ducts to one another.

* * * * *